United States Patent [19]

Fromme et al.

[11] 4,109,768
[45] Aug. 29, 1978

[54] CURRENT COLLECTOR LINE

[75] Inventors: Hans-Georg Fromme, Stuttgart; Guckenhan Dieter, Sindelfingen, both of Fed. Rep. of Germany

[73] Assignee: Thyssen Aufzüge GmbH, Stuttgart, Fed. Rep. of Germany

[21] Appl. No.: 811,250

[22] Filed: Jun. 29, 1977

[30] Foreign Application Priority Data

Jun. 29, 1976 [DE] Fed. Rep. of Germany ....... 2629215

[51] Int. Cl.² ............................................. B60M 1/00
[52] U.S. Cl. .................................... 191/22 R; 191/32
[58] Field of Search ...................... 191/22 R, 23, 29 R, 191/32, 33 R, 34, 40, 57, 59.1; 246/65; 339/21 R, 21 S, 22

[56] References Cited

U.S. PATENT DOCUMENTS

| 2,912,526 | 11/1959 | Hermann et al. | 191/23 A |
| 3,155,207 | 11/1964 | Blemly et al. | 191/23 A |
| 3,916,089 | 10/1975 | Sloan | 191/32 X |
| 3,995,725 | 12/1976 | Howell, Jr. | 191/32 X |

FOREIGN PATENT DOCUMENTS

124,265 3/1949 Sweden ................................. 191/23 A

*Primary Examiner*—Stephen G. Kunin
*Attorney, Agent, or Firm*—Shlesinger, Arkwright, Garvey and Dinsmore

[57] ABSTRACT

A current collector line especially for electric trolley systems and the like wherein a support member is attached to the rail of the trolley system and includes an adapter interlocked with the bus bar and with the support member, and wherein the adapter is locked in engagement with the support member by flexible detents and the bus bar includes flexible portions maintaining its engagement with the adapter.

13 Claims, 5 Drawing Figures

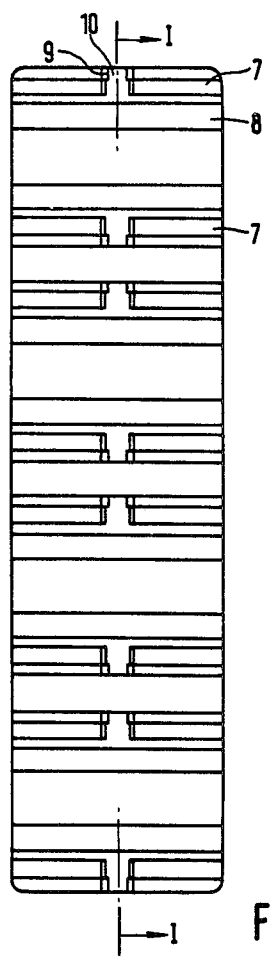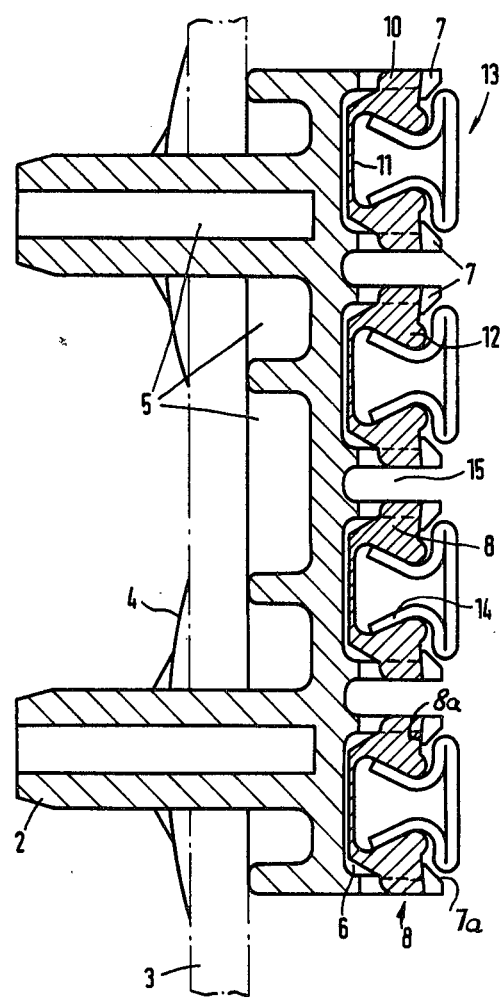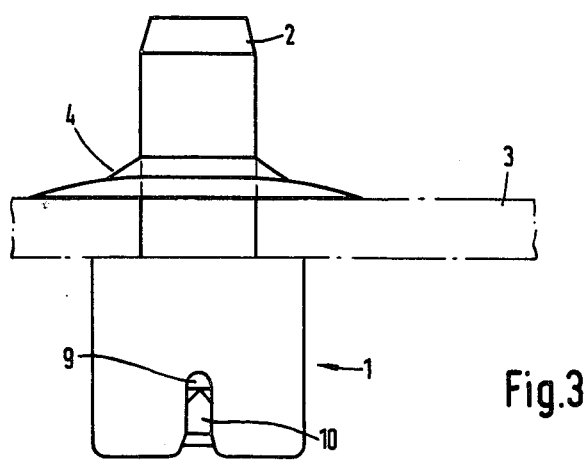
Fig. 2
Fig. 1
Fig. 3

CURRENT COLLECTOR LINE

The invention relates to a current collector line with supports, with assembly parts form-locking with the bus bar for a clamp attachment of the bus bar e.g. to a guide rail for moving users, especially for mechanisms of electric trolley systems.

A current collector line with longitudinally slotted insulating sheathing is already disclosed in DT-PS 12 71 750, wherein such lines are used for the lowering of current through movable trolley arms, and the protective sheathing surrounding the bus bar on three sides is for safety as well as for prevention of short circuits. The bus bar itself is supported by a control element formed at the base of the insulating sheathing and consists of flexible material which is expanded after penetration into the inner profile of the bus bar.

In order to obtain an improved insulation with this type of current collector line with protective sheathings, DT-AS 24 53 754 discloses that a distance is to be left between the side walls of the protective sheathing and the bus bar profile. But since these side parts no longer aid in the support of the bus bar in the insulation sheathing, additional assembly parts are necessary for each bus bar, which parts are inserted in the U-profile of the bus bar and effect a clamp holding. These spring arms are remarkably thin, considering the quite small opening of the bus bar U-profile and the spring deflection, and they therefore do not guarantee absolutely sure attachment. Additional spring arms are formed on the assembly parts, with the aid of which the bus bar itself is inserted into a clamp installation on the base of the insulating sheathing, whereby the additional spring arms are dropped to the rear on the connecting strips running longitudinally along the side walls of the insulating sheathing.

The current collector lines around the bus bars in insulating sheathings are then mostly used if the users work with heavy current over those lines. On account of the lower safety requirements with use of lower voltage (e.g. 40 volts), it is possible to greatly simplify the assembly of such current collector lines, since the insulating sheathings between adjacent bus bars remain the same. Of course for such uses there is also the requirement for the simplest and most rapid and safe laying of the current collector line or the individual bus bars in supports, which are to be attached on the track runway rails profiles of an electric trolley.

With such current collector lines, it is customary for operating safety during the current drop through a user, and for a simple total structure, if the connector and the supports for the bus bar do not project out over the front sliding contact surface of the bus bar. Then, since the trolley arms have a great deal of play, sideways projecting lengths must be avoided over said sliding contact surface of the bus bars, which would cause damage. The carbon brushes which are arranged in a trolley arm together and attached to the individual bus bars run the danger of being collided with and left hanging on such projecting parts.

The object of the invention is to provide a current collector line of the desired free arrangement of the sliding contact surface of the bus bars, and to provide a support for simplified assembly of the bus bars on track runway rails of overhead trolleys or the like, wherein both the supports in such arrangement and also the bus bar therein are easy to assemble.

This object is achieved in that the assembly parts are embodied as an adapter surrounding the narrower parts of the bus bar profile which are turned away from the sliding contact surface, with such a configuration that they can be engaged in installations formed by flexible blades on the support. This is known in bus bars e.g. of curved or rolled copper sheet metal, of which the area turned away from the sliding contact surface has inclined surfaces as in a dovetail profile. A commercial bus bar profile which is produced out of a copper band in a roller inverter includes, projecting from a U-profile, arms curved 90° inward, which are thereafter provided with an opposite curve to the outside, so that these inclined surfaces are comparable to those of a dovetail profile. This common outer profile form is reasonable because large copper inserts can be inserted into the inside, if necessary.

Since the outward inclined arms of this bus bar profile do not get inserted in a support, which is in most cases formed of insulating plastic, the adapter is provided surrounding the narrower area of the bus bar profile, of which the outer form can be inserted and be locked in the installation formed by flexible blades on the support. This structural form has the further important advantage that the supports to be attached to the track runway rails need have only a very small longitudinal dimension and that at any desired point the current collector can be provided with more or fewer supports, without being assigned to a perforated screen stamped out in the track runway rail of the overhead trolley. For example, in a curved area, the current collector line is attached with more supports per length unit than in straight sections. Therefore, it is possible to provide supports at the ends of bus bars, e.g. in the area of the projections at the beginning and the end of each bus bar, and the bus bar can be clamped tightly by the adapters which are surrounding or slipped over it. The advantages are also shown with similar rail profiles since a surface which is independent of the sliding contact surface is provided for the clip attachment or catch.

According to another feature of the invention, the outside of the adapter can have at least one catch which fits in a slot in the blade of the support for fixation of the adapter against longitudinal displacement. The possibility of longitudinal slide of the adapter on the bus bar remains until the assembler fits the catch on the adapter into the corresponding slot in the support. But the possibility of longitudinal slide remains within certain limits after attachment of this clamp, which is to be considered in the laying of the current collector line, especially within track curvatures, and is also of some importance in longitudinal expansions of the bus bar section.

Shoulders are provided on the outside of the adapter to engage on barb-like projections of the blades. The topsides of the blades used with the bus bar on the support are embodied both as sliding surface for the impression of the adapter and also as base for the rear side of the sliding contact surface of the bus bar profile.

Although the adapter can be of rigid material, and in this case is moved on the bus bar, it is preferred that the adapter be embodied as surrounding profile for the rearside of the bus bar, whereby the ground bar of the adapter consists of flexible or elastic material. With this embodiment, the adapter is not moved on top of, but can be wrapped around the bus bar.

Furthermore, the clamp attachment of the bus bar with the adapter can be guaranteed in the support installation, so that the elasticity of the ground bar section of the adapter makes a relative movement of the adapter possible on the inclined surfaces of the bus bar profile, whereby the bus bar profile is biased inward against the topside of the blades and the adapter shoulders are biased outward against the projections of the blades. The bias can result in that the height of the installation in the support between the base and the projections of the blades is greater than the height of the adapter between base and shoulder.

Through pins are preferred for attachment of the support to the track runway rail, which pins are fitted into a hold grid in the bus bar profile. Still simpler attachment arrangements are obtained if the bus bar is formed for example, of a aluminum and produced by the extrusion press method, and then grooved or beaded longitudinal profiles can be formed. In the same method, undercuts can also be effected on the bars of the bus bar profile, which makes very simple clamp fastenings possible.

Embodiments of the invention are described in the following in connection with the drawings.

FIG. 1 shows a vertical cross section through one embodiment of an insulating support, which is attached to a track runway rail and carries bus bars held with the aid of adapters.

FIG. 2 shows a plan view of the support as in FIG. 1, but without bus bars.

FIG. 3 shows a plan view of the support as in FIG. 2.

Figure 5:
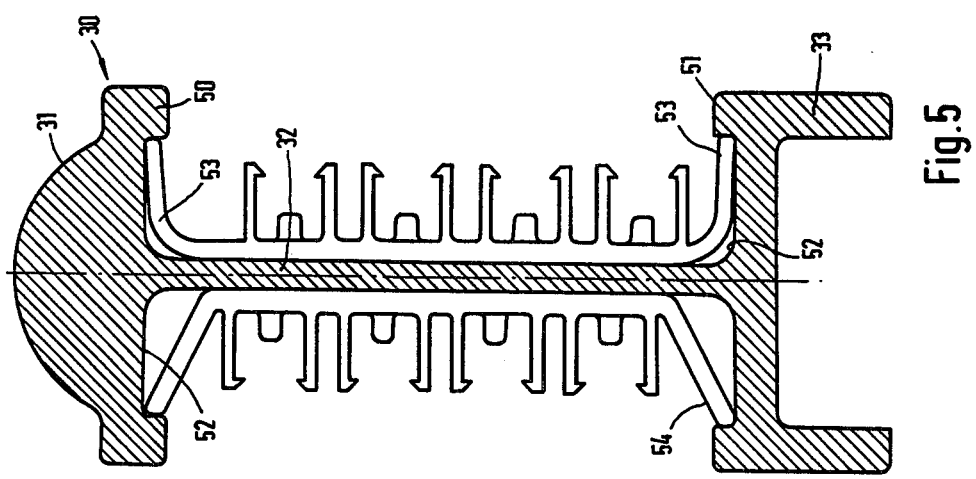
FIG. 5 shows a similar representation as FIG. 4, with two variations for the clamp fastening of supports to a track runway rail.

A preferably plastic support 1 as shown in FIGS. 1 to 3 and is provided with through pins 2, which project through openings of a track runway rail 3. Locking washers 4 are slipped on pins 2 so that support 1 is biased against rail 3. For saving of weight and material, the support can have various cutouts 5.

On the front, the support has mountings 6 for the current collector line, corresponding to the number of bus bars to be accomodated, which are bordered on the side by flexible blades 7. Cutouts 15 are provided between adjacent blades 7. Blades 7 include, preferably in the middle, slots 9 to receive projections 10, which are formed on the outside walls and are called the adapter 10 (FIGS. 2 and 3).

The adapters 8 are adaptation elements of plastic for an e.g. open bus bar profile 13, which has a flat top sliding contact surface, while the bottom profile consists of spread open support blades 14, which form inclined outer surfaces as in dovetail profiles.

The base wall 11 of adapter 8 is thin so that it will be flexible. The adapter lies against the inclined surface of the spread open support blades 14, and lies with the outer walls shown in broken lines on the side walls of said blades 7, which are essentially parallel thereto. These blades have barbed projections, of which the inclined topsides 7a are slide surfaces for the insertion of the adapter. These sections 7a also serve for mounting or support of the bus bar profile 13, which, because of the flexibility of the support blades and the adapter, pushes itself against the surfaces 7a. The side walls 12 of of adapter 8 with projections 10 end on both sides with shoulders 8a, which are overlapped by flexible blades 7.

Figure 4:
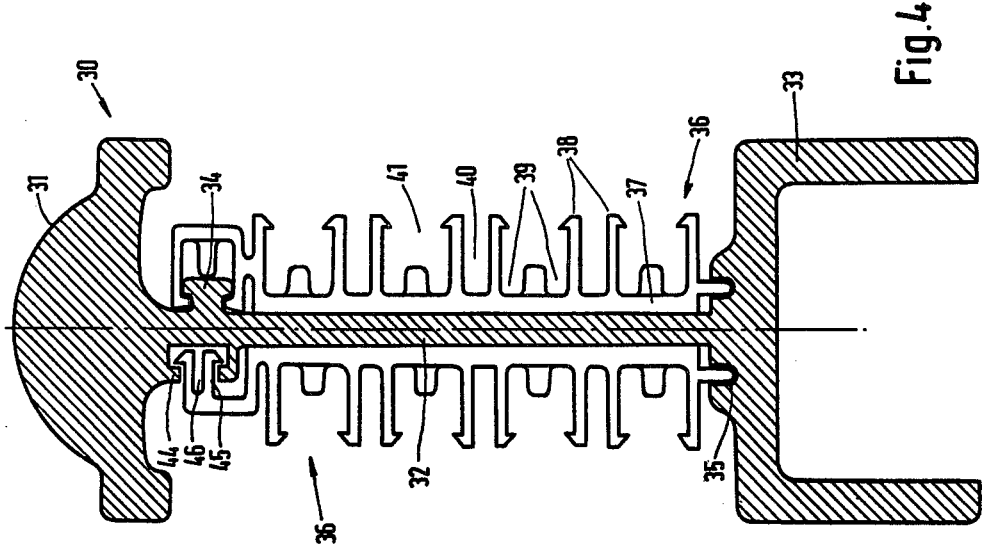
FIG. 4 shows a diagrammatic cross section through a track runway rail of an overhead track of an extrusion press profile with different types of attachments for current collector line supports shown on the two sides of the midline.

FIG. 4 shows the extrusion press profile of track runway rail 30 with a top running surface 31, a control bar 32 and a base 33. A top profile element 34 serves for the clamp attachment of a current collector line circuit 36, which is received with a bottom projection in a bottom groove 35 of the track runway rail profile. The support has a base wall of which the flexible blades 38 project to hold the adapter connected with the bus bars. Also, support 36 can be provided with cutouts or depressions 39, in order to lengthen blades 38 and to increase their flexibility. The cutouts 40 in FIG. 4 correspond to the cutouts 15 in FIG. 1.

The left side of the track runway rail of FIG. 4 shows a longitudinal groove 44 to receive a pillbox-like profile 45 of support 46 and can be inserted in the groove.

The extrusion profile of a track runway rail of FIG. 5 is similar to that of FIG. 4, wherein however a top elevation 50 and a bottom elevation 51 form receiving areas 52 for flexibly curved clamping blades 53, which are inserted on the left side of the midline in FIG. 5 at point 54 and consist of rigid material and are inserted behind the shoulders formed by elevations 50 or 51. The resistance against deformation of the receiving cutouts between the flexible blades 38 which the adapter is to surround is limited by the projections projecting from the base of the holder.

What is claimed is:

1. A current collector line for electric trolley systems and the like and including assembly parts form-locking with a bus bar for clamp attachment of the bus bar to a guide rail for moving users comprising:
   a support member having a plurality of cutouts defined by a rear wall and flexible locking blades,
   adapter members positioned in said cutouts and retained therein by means of said locking blades, said adapter members being of generally C-shaped cross-section and having an outer shape conforming generally to the shape of said cutouts and an inner configuration wherein the open side is of reduced width and enlarges progressively inwardly,
   a bus bar having a sliding contact surface and a pair of depending legs positioned in each of said adapter members, said legs each being progressively inwardly then outwardly turned with respect to said contact surface so as to have a shape conplementary to the inner configuration of said adapter members and be form-locked therein.

2. A current collector line as in claim 1, wherein the outside of said adapter has at least one projection for which a corresponding receiver slot is formed in said locking blades for the fixation of said adapter against longitudinal displacement.

3. A current collector line as in claim 1 wherein shoulders are provided on the outside of said adapter for engaging projections on said blades.

4. A current collector line as in claim 1, wherein the topsides of said blades are turned inwardly toward said bus bar and are embodied both as a sliding surface for insertion of the adapter and also as a base for the rearside of the sliding contact surface of the bus bar profile.

5. A current collector line as in claim 4, wherein the area of bus bar which is turned away from the sliding contact surface has an inclined surface in a dovetail profile, to which said adapter engages tightly.

6. A current collector line as in claim 5, wherein said adapter, embodied as surrounding profile for the rearside of bus bar, has flexible through pins in both sides.

7. A current collector line as in claim 6, wherein the clamp attachment of said bus bar with said adapter in said cutouts results in said bus bar being biased against said blades and said adapter being biased against said blades.

8. A current collector line as in claim 7, wherein the the height of said cutouts in said support member between said rear wall and said blades is greater than the height of the adapter between its rear wall and shoulder.

9. A current collector line as in claim 1, wherein said support has through pins on the side turned away from the current collector line for attachment in openings of the track runway rail.

10. A current collector line as in claim 1, wherein said support has flexible clamp profiles on the top and bottom of the support which cooperate with outside bars on the profile of the track runway rail.

11. A current collector line as in claim 10, wherein the side of the support opposite the clamp attachment has a fixation projection received in a longitudinal groove of the track runway rail.

12. A current collector line as in claim 1, wherein said support has flexible material clamp blades at its top and bottom ends pressed into cutouts of corresponding dimensions in the track runway rail profile.

13. A current collector line as in claim 1, wherein the rigidity against deformation of the cutouts between flexible blades which an adapter is to surround is limited by projections extending through the middle from the base of support.

* * * * *